United States Patent [19]

Uchida

[11] Patent Number: 5,531,320

[45] Date of Patent: Jul. 2, 1996

[54] OPTICAL DISC ACCOMODATION DEVICE

[75] Inventor: Hiromichi Uchida, Tokyo, Japan

[73] Assignee: Toyo Chemical Co., Ltd., Tokyo, Japan

[21] Appl. No.: 324,756

[22] Filed: Oct. 4, 1994

[51] Int. Cl.$^6$ ........................................... B65D 85/57
[52] U.S. Cl. .................. 206/308.1; 206/311; 206/313
[58] Field of Search ........................ 206/308.1, 308.2, 206/313, 312, 309, 232

[56] References Cited

U.S. PATENT DOCUMENTS

| | | | |
|---|---|---|---|
| 1,098,154 | 5/1914 | Housh | 206/311 |
| 3,987,900 | 10/1976 | Tadokoro | 206/313 |
| 4,850,731 | 7/1989 | Youngs | 206/313 X |
| 4,971,195 | 11/1990 | Mitsuyama | 206/311 |
| 5,096,064 | 3/1992 | Rufo, Sr. et al. | 206/309 X |
| 5,147,036 | 9/1992 | Jacobs | 206/313 X |
| 5,396,987 | 3/1995 | Temple et al. | 206/309 |
| 5,422,875 | 6/1995 | Bribach | 206/312 X |

*Primary Examiner*—Bryon P. Gehman
*Attorney, Agent, or Firm*—Wenderoth, Lind & Ponack

[57] ABSTRACT

An optical disc accommodation device is disclosed which permits a plurality of optical discs to be stored in a neat arrangement and so as to be easily retrieved without allowing possibility of contaminating or causing scars and scratches to the recording surface during the accommodation. The optical disc accommodation device comprises an optical disc accommodation bag section having a sheet formed with an optical disc accommodation recess and a soft sheet bonded to the upper surface of the sheet, a stepped recess formed rearward of the optical disc accommodation bag section and open to the optical disc accommodation recess. Stopper projections are provided on the opposite sides of the optical disc accommodation recess such as to be in contact with the outer periphery of the optical disc for preventing the optical disc from falling out through an opening of the optical disc accommodation bag section.

7 Claims, 5 Drawing Sheets

OPTICAL DISC ACCOMODATION DEVICE

BACKGROUND OF THE INVENTION

1. FIELD OF THE INVENTION

This invention relates to optical disc accommodation devices for accommodating optical discs such as musical compact discs (CD) and computer compact discs (CD-ROM). More particularly, the invention concerns an optical disc accommodation device, which permits a plurality of optical discs to be accommodated in a neat arrangemewnt, is free from the possibility of detachment or falling out of accommodated discs, and permits accommodation and removal of desired optical discs quickly and smoothly without contaminating the recording surface.

2. PRIOR ART

The prior art optical disc accommodation devices of the pertinent type mostly comprise a single transparent or opaque synthetic resin bag body having optical disc accommodation and removal sections. In such a bag body, a single optical disc is accommodated for its protection and prevention of attachment of the most detested dust to it.

To arrange and store a plurality of optical discs, a plurality of optical disc accommodation devices which each comprise such a bag body, are accommodated in a box. Then, whenever it is desired to use a disc, such a disc is searched for and then removed.

However, although with the prior art optical disc accommodation device it has been possible to a certain extent to prevent the dust attachment, it has been very difficult to accommodate a plurality of optical discs in a neat and stable arrangement and also removal desired discs or accommodate discs readily, quickly and smoothly without possibility of touching the recording surface with fingers.

SUMMARY OF THE INVENTION

The invention seeks to provide an optical disc accommodation device, which can overcome the above drawbacks, can prevent attachment of dust, permits a plurality of optical discs to be accommodated in a neat arrangement and without the possibility of detachment, permits discs to be accommodated and removed readily and quickly and without causing scars and scratches to and contaminating the recording surface, and permits information or memories belonging to the accommodated discs to be also accommodated in an arrangement.

DETAILED DESCRIPTION OF THE PREFERRED EMBODIMENT

Figure 1:
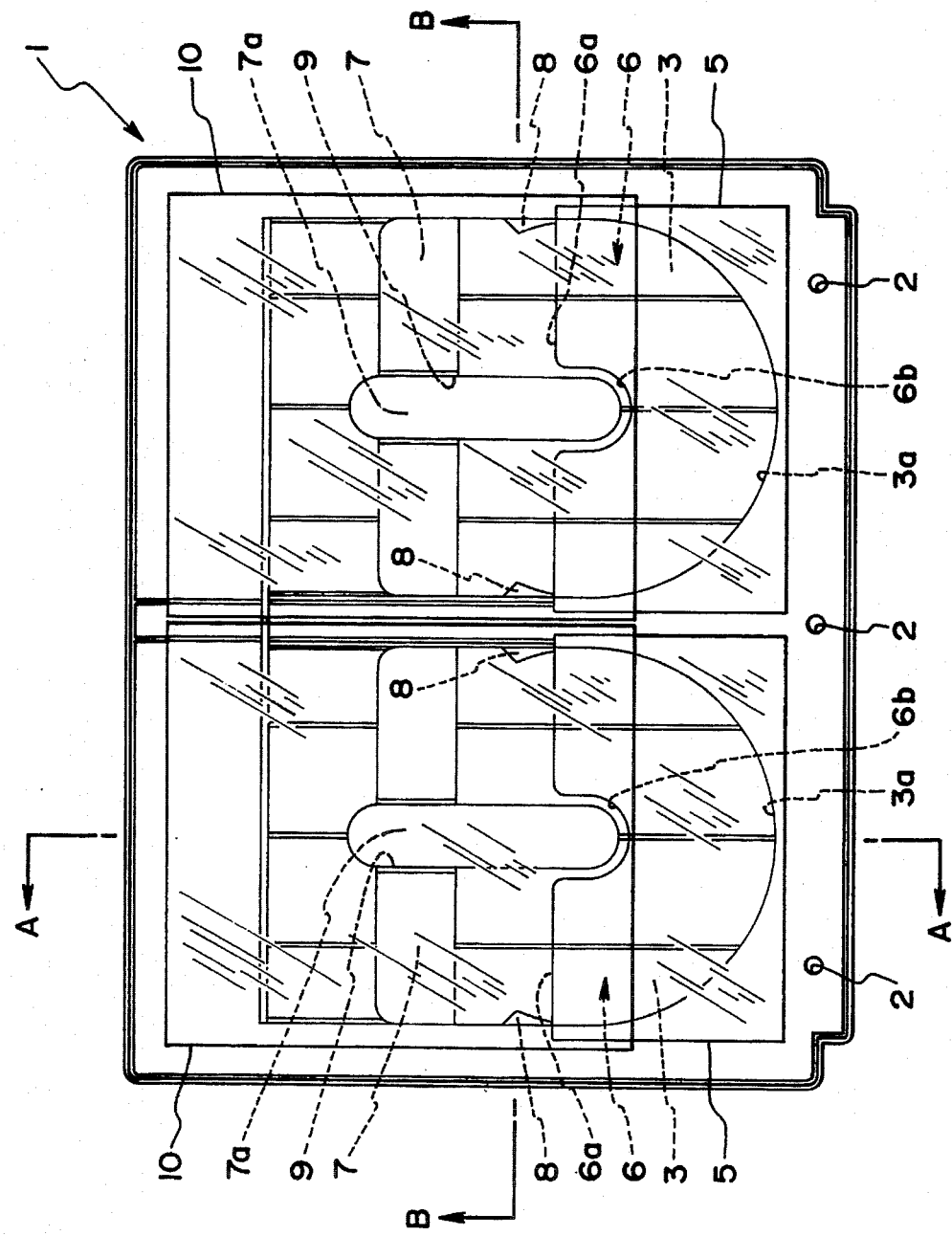
FIG. 1 is a plan view showing an optical disc accommodation device according to the invention.
Figure 2:
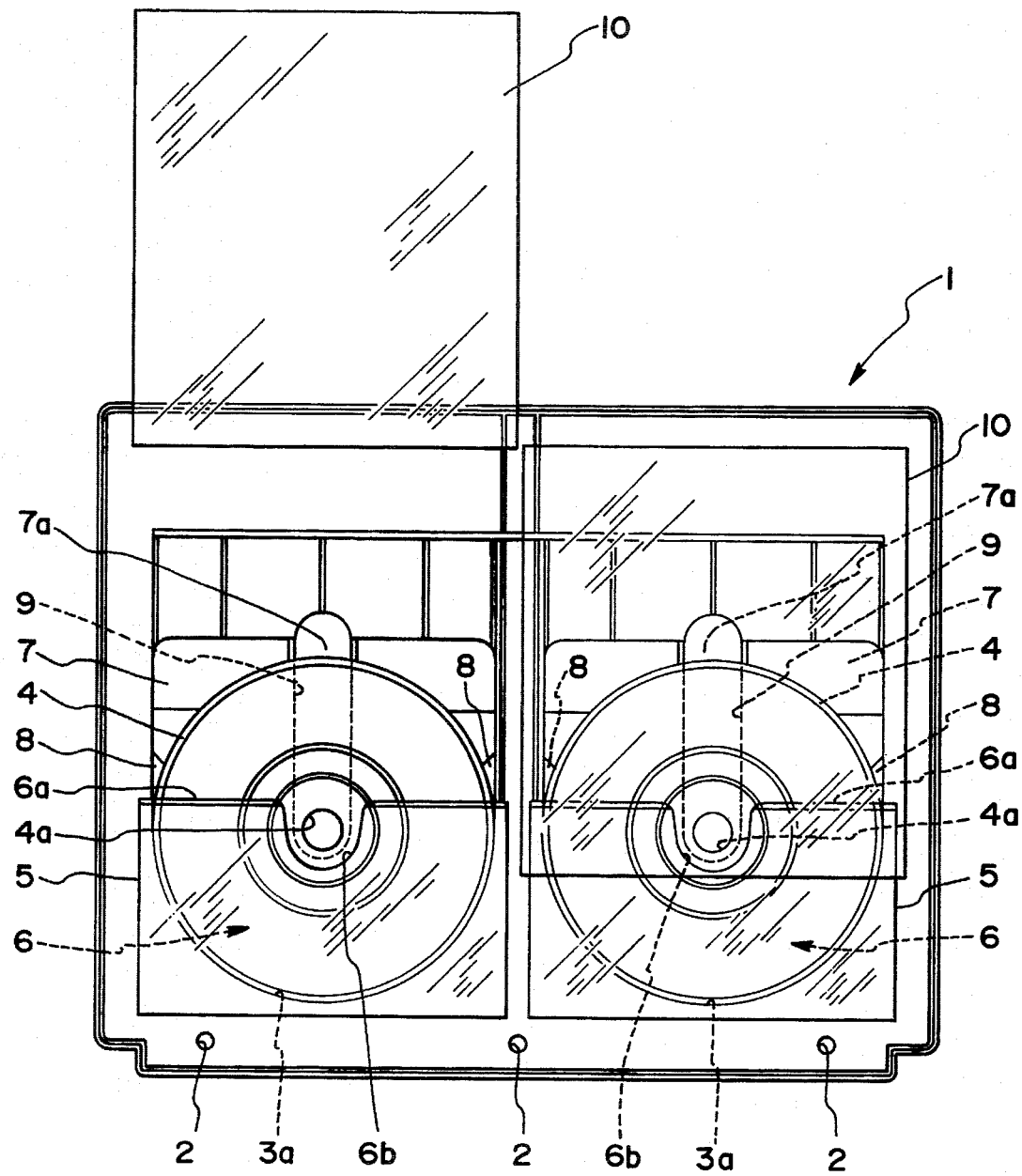
FIG. 2 is a plan view showing the optical disc accommodation device according to the invention with optical discs accommodated therein.
Figure 3:
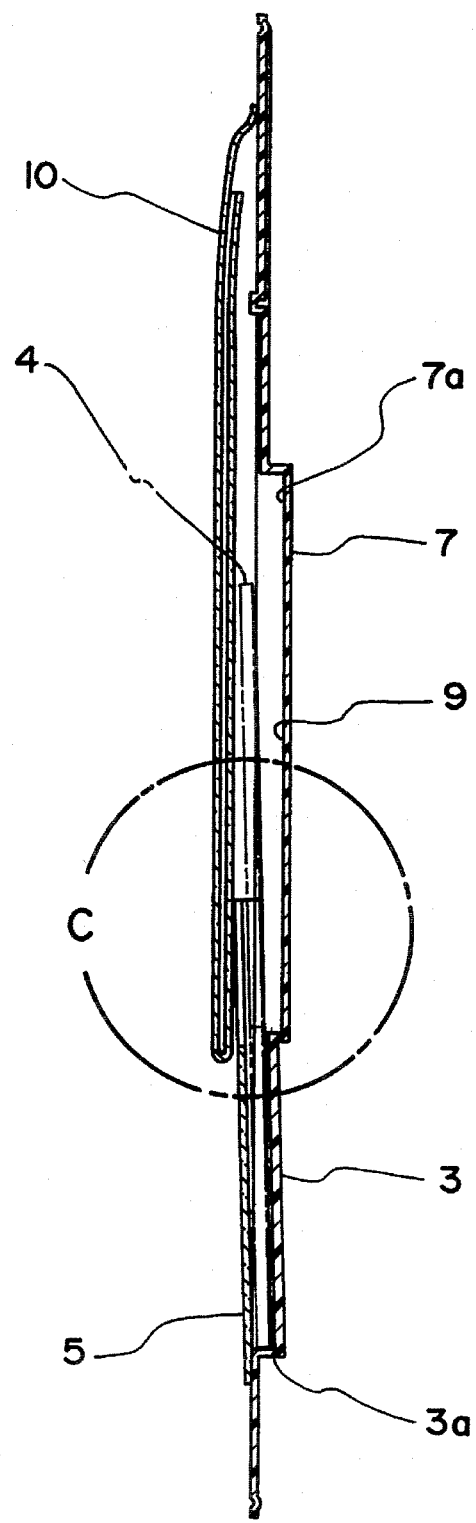
FIG. 3 is a sectional view taken along line A—A in FIG. 1.
Figure 4:
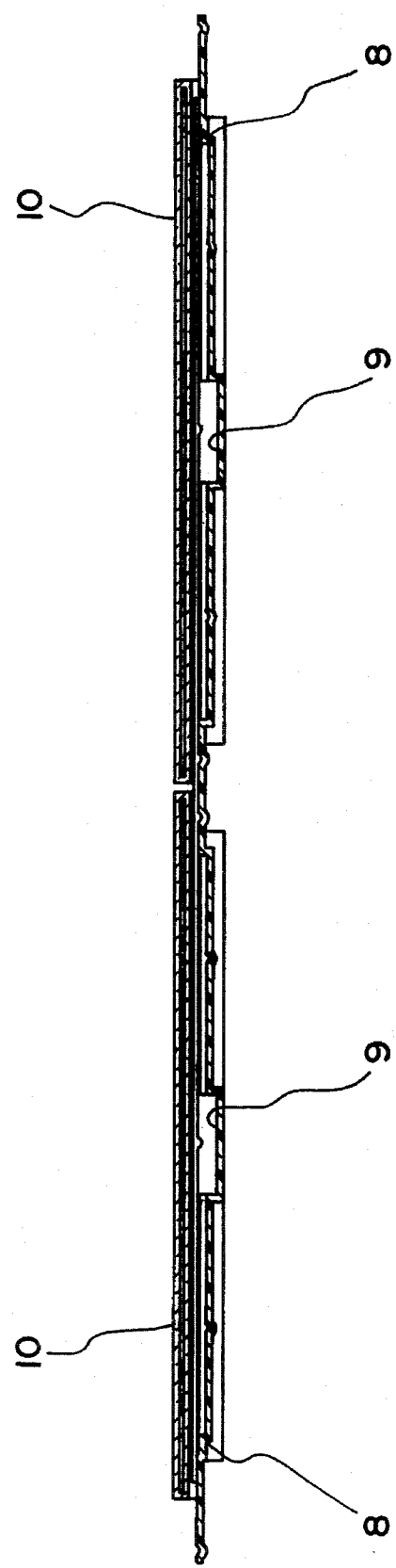
FIG. 4 is a sectional view taken along line B—B in FIG. 1.
Figure 5:
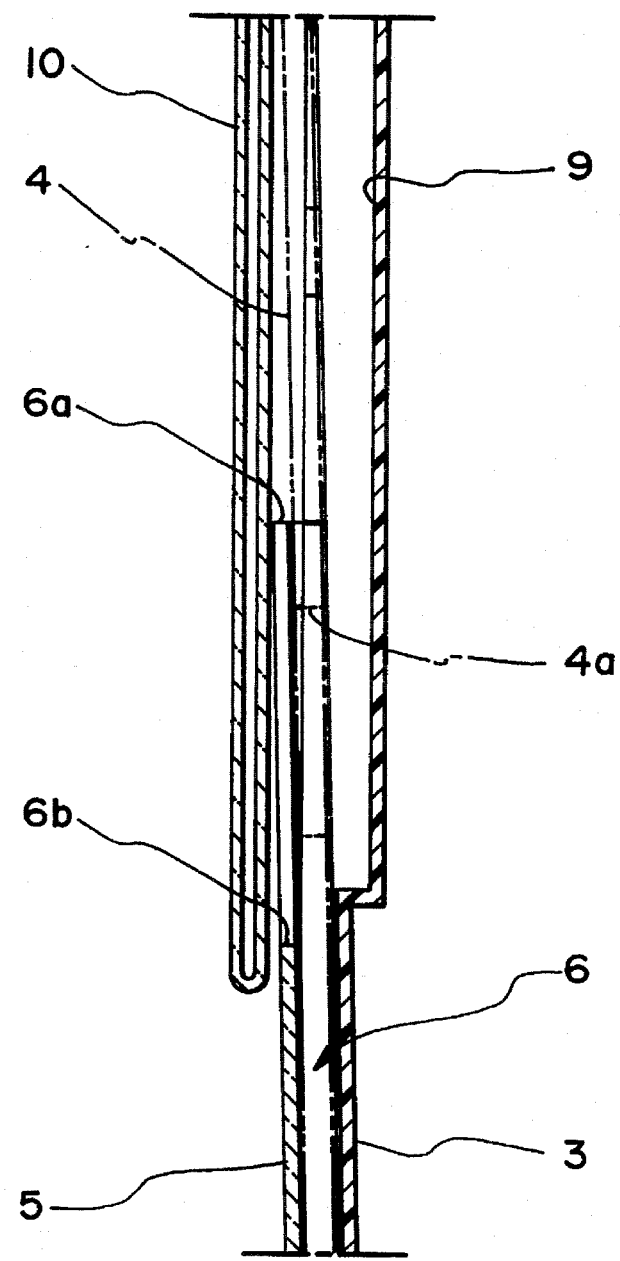
FIG. 5 is a fragmentary enlarged-scale view showing a portion C in FIG. 3.

Referring to the Figures, designated at 1 is an optical disc accommodation device according to the invention. The device is made from synthetic resin sheets. In order to be able to use a plurality of optical disc accommodation devices by filing them in a binder, the embodiment has an engagement section formed along one side, i.e., in this embodiment filing holes 2, for inserting bands therethrough to couple together a plurality of optical disc accommodation devices.

Designated at 3 are optical disc accommodation recesses. Each optical disc 4 is accommodated in each optical disc accommodation recess 3 such that a half circular (i.e., semicircular) portion of its outer periphery is in contact with a half circular wall 3a of the recess 3 formed on one side so that it can be pulled out therefrom.

Designated at 5 is a sheet of a soft synthetic resin material which is bonded to an edge portion adjacent to each optical disc accommodation recess 3 and extending up to an intermediate portion thereof. The sheet 5 forms an optical disc accommodation bag 6 in combination with each optical disc accommodation recess 3.

The optical disc accommodation bag 6 has an opening 6a, the edge of which has a curved portion 6b formed by notching a portion over the center hole of the optical disc to permit a finger to be inserted in the central hole 4a of the optical disc 4 for pulling the disc in one direction when removing the disc.

Designated at 7 is a stepped recess which is formed at a position corresponding to an intermediate portion of each optical disc accommodation recess 3 and rearward of the opening 6a of the optical disc accommodation bag 6. The step recess is deeper than the optical disc accommodation recess 3 and has a finger reception space 7a for supporting the peripheral edge of the optical disc 5 exposed by the optical disc accommodation bag 6.

The optical disc accommodation recess 3 becomes gradually shallower as one goes toward the recess step 7.

Designated at 8 are stoppers for preventing the accommodated optical disc 4 from being detached from the optical disc accommodation bag 6 through the opening 6a thereof. The stoppers 8 are projections projecting into the optical disc accommodation recess 3 from the opposite sides thereof corresponding to the opposite sides of a lower half portion of the optical disc extending from the center thereof toward the stepped recess 7. Their shape conforms to the shape of the outer periphery of the optical disc 4, and they are in contact with the optical disc outer periphery to perfectly prevent the falling of the disc through the opening 6a of the optical disc accommodation bag 6.

Designated at 9 is a finger reception groove for use in grasping and removing an optical disc accommodated in the device, which is formed such that it extends from a portion corresponding to the center hole 4a of the optical disc 4 in the optical disc accommodation recess 3 to a portion corresponding to the finger reception space 7a of the stepped recess 7. The groove 9 has the same depth as the depth of the stepped recess 7 and also as the depth of a recess step formed in a portion of the optical disc accommodation recess 3 corresponding to the optical disc center hole 4a.

Designated at 10 is a cover having one side bonded to the sheet rearward of the stepped recess 7 such that it can be opened and closed. The cover 10 can removably accommodate a jacket, a liner note, or the like for the case in which the accommodated disc is a musical compact or information, memory data or the like for the case in which the accommodated disc is a computer compact disc. When the cover 10 is closed, its other side is located on the top surface of the optical disc accommodation bag 6 over the optical disc accommodation recess 3. Thus, the cover 10 has its intrinsic function to prevent dust attachment to the accommodated optical disc 4.

With the optical disc accommodation device having the construction as described above according to the invention, to accommodate an optical disc by holding the edge of the central hole 4a of the disc 4 and the peripheral edge thereof with fingers without touching the recording surface of the disc, the disc 4 is inserted into the optical disc accommodation bag 6 through the opening 6a thereof along the finger reception groove 9 until a half circumference portion of the disc is brought into contact with the half circular wall 3a of the optical disc accommodation recess 3.

At the time of the disc insertion, the stoppers 8 constitute an obstacle. However, since the sheet 5 constituting the optical disc accommodation bag 6 is made from a flexible and soft synthetic resin sheet, the optical disc 4 can be inserted into the optical disc accommodation recess 6 through the opening thereof by slightly raising it and thereby clearing the stoppers 8.

Further, since the optical disc accommodation recess 3 has a gently downward slope toward the half circular wall 3a, the optical disc 4 can be accommodated smoothly without contaminating or causing scars or scratches to the recording surface of the disc.

The detachment of the optical disc in the upward direction after the accommodation, is prevented by the optical disc accommodation recess 6. In addition, the detachment of the disc through the opening 6a of the optical disc accommodation bag 6 is perfectly prevented by the stoppers 8 projecting into the optical disc accommodation recess 3 from the opposite sides thereof. Thus, there is no possibility that disc will fall out of the optical disc accommodation device 1 or be broken, or damaged or contaminated.

To remove the optical disc 4, since the outer periphery of the disc exposed from the opening 6a of the optical disc accommodation bag 6 is floated from the surface of the optical disc accommodation recess 3 owing to the stepped recess 7 and thus can be readily supported with finger or fingers, the disc can be reliably held with such finger or fingers and the finger inserted in the center hole 4a of the optical disc 4. Thus, by making use of the soft characteristic of the sheet 5 of the optical disc accommodation bag 6, the optical disc 4 can be raised slightly to release its contact with the stoppers 8 to pull it out easily and smoothly along the finger reception groove 9. Again during this removal operation, there is no possibility of causing contamination of or scars or scratches to the recording surface of the optical disc 4.

As has been described in detail in the foregoing, with the optical disc accommodation device according to the invention, unlike the prior art device comprising a single bag body, there is no possibility that the optical disc will fall out or that it will incur scars and scratches to the recording surface of the disc. In addition, it is possible to accommodate and remove optical discs conveniently. Amongst many useful effects that are obtainable, it is the most important effect that optical discs can be accommodated in a stable state and in a neat arrangement.

As further effects, in the case of using the optical disc accommodation device according to the invention in a binder, it is possible to accommodate optical discs in a neat arrangement and without taking unnecessary space, and thus more efficiently. Further, a desired optical disc among a large number of optical discs can be removed easily and quickly. Further, it is possible to accommodate and remove optical discs readily and smoothly without causing scars and scratches to or contaminating the recording surface of the disc. Further, it is possible to accommodate in an arrangement, together with the accommodated optical disc, necessary material belonging thereto, for instance a jacket, a liner note, or the like when the accommodated disc is a musical compact disc, and information, memory data or the like when the accommodated disc is a computer compact disc. Further, it is possible to perfectly prevent dust attachment to the disc.

What is claimed is:

1. An optical disc accommodation device comprising:

a first sheet having a first end portion, a second end portion, a front surface and a rear surface, said first sheet being formed with an optical disc accommodation recess;

a second sheet, formed of a synthetic resin material, bonded to said front surface of said first sheet at a bottom edge thereof below said optical disc accommodation recess and extending upwardly to a location intermediate a top portion and a bottom portion of said optical disc accommodation recess, an upwardly directed opening of said optical disc accommodation recess being defined at an upper edge of said second sheet between said first and second sheets to allow an optical disc accommodated in said optical disc accommodation recess to be removed therefrom;

wherein a stepped recess, stepped rearwardly of said optical disc accommodation recess, is formed in said first sheet and is open to a central portion of said optical disc accommodation recess for providing a gap between a rear surface of an optical disc accommodated in said optical disc accommodation recess and a front surface of said first sheet at an upper portion of the optical disc accommodated in said optical disc accommodation recess, said stepped recess including a finger reception space for allowing the upper portion of the optical disc accommodated in said optical disc accommodation recess to be grasped with a finger; and stopper projections disposed in said optical disc accommodation recess at opposite sides thereof and at locations corresponding to an upper half portion of the optical disc accommodated in said optical disc accommodation recess, said stopper projections having respective optical disc contacting surfaces conforming in shape to an outer periphery of the optical disc for contacting the outer periphery of the optical disc accommodated in said optical disc accommodation recess to prevent the optical disc from falling out of the optical disc accommodation recess through said opening thereof.

2. The optical disc accommodation device according to claim 1, wherein a finger reception groove is formed and extends from a portion corresponding to a center hole of the optical disc accommodated in the optical disc accommodation recess to said finger reception space of said stepped recess, said finger reception groove having the same depth as the stepped recess.

3. The optical disc accommodation device according to claim 1, wherein said first sheet is formed with a filing section for use in binding together a plurality of optical disc accommodation devices.

4. The optical disc accommodation device according to claim 1, wherein said optical disc accommodation recess has a continuously decreasing depth in a front-to-rear direction in moving toward said stepped recess.

5. The optical disc accommodation device according to claim 1, further comprising a cover having a top edge bonded to a front surface of said first sheet at a top edge portion thereof, said cover being movable between a closed position in which it overlies said opening of said optical disc accommodation recess to prevent intrusion of dust, and an open position to allow insertion and removal of an optical disc through said opening of said optical disc accommodation recess.

6. The optical disc accommodation device according to claim 5, wherein said cover includes a pocket for accommodating an information sheet.

7. The optical disc accommodation device according to claim 1, wherein an upper edge of said second sheet, at a location aligned with a central hole of an optical disc accommodated in said optical disc accommodation recess, includes a curved notch portion for permitting insertion of a finger into the central hole of the optical disc accommodated in said optical disc accommodation recess.

* * * * *